(12) United States Patent
Cochran

(10) Patent No.: US 6,569,019 B2
(45) Date of Patent: May 27, 2003

(54) WEAPON SHAPED VIRTUAL REALITY CHARACTER CONTROLLER

(76) Inventor: William Cochran, 211 Michigan, South Houston, TX (US) 77587

( * ) Notice: Subject to any disclaimer, the term of this patent is extended or adjusted under 35 U.S.C. 154(b) by 0 days.

(21) Appl. No.: 09/901,742

(22) Filed: Jul. 10, 2001

(65) Prior Publication Data

US 2003/0013524 A1 Jan. 16, 2003

(51) Int. Cl.[7] .......................... A63F 13/00; A63F 9/24; G06F 17/00; G06F 19/00
(52) U.S. Cl. .............................. 463/37; 463/47; 341/20
(58) Field of Search ............................. 463/36, 37, 38, 463/2, 8, 46, 47; 341/20

(56) References Cited

U.S. PATENT DOCUMENTS

| | | | | |
|---|---|---|---|---|
| 4,395,045 A | * | 7/1983 | Baer | 273/312 |
| 5,353,134 A | * | 10/1994 | Michel et al. | 359/52 |
| 5,386,308 A | * | 1/1995 | Michel et al. | 359/83 |
| 5,569,085 A | * | 10/1996 | Igarashi et al. | 463/49 |
| 5,641,288 A | * | 6/1997 | Zaenglein, Jr. | 434/21 |
| 5,690,492 A | * | 11/1997 | Herald | 434/20 |
| 5,734,370 A | * | 3/1998 | Skodlar | 345/156 |
| 5,954,507 A | * | 9/1999 | Rod et al. | 434/19 |
| 6,005,548 A | * | 12/1999 | Latypov et al. | 345/156 |
| 6,050,822 A | * | 4/2000 | Faughn | 434/11 |
| 6,206,783 B1 | * | 3/2001 | Yamamoto et al. | 463/36 |
| 6,296,486 B1 | * | 10/2001 | Cardaillac et al. | 463/12 |
| 6,328,650 B1 | * | 12/2001 | Fukawa et al. | 463/36 |
| 6,328,651 B1 | * | 12/2001 | Lebensfeld et al. | 463/52 |
| 6,379,249 B1 | * | 4/2002 | Satsukawa et al. | 463/31 |

* cited by examiner

Primary Examiner—Denise L. Esquivel
Assistant Examiner—Marc Norman
(74) Attorney, Agent, or Firm—Arthur M. Dula

(57) ABSTRACT

The present invention is a virtual reality game controller that is shaped like a weapon such as a rifle, pistol or shotgun. The controller has at least one multiaxis controller that is actuated by movement part of the weapon, for example its forearm also has a plurality of switch controls that are positioned on the weapon to control movement and actions and attributes of a VR game character within the VR game space without interrupting the playing of the game.

4 Claims, 3 Drawing Sheets

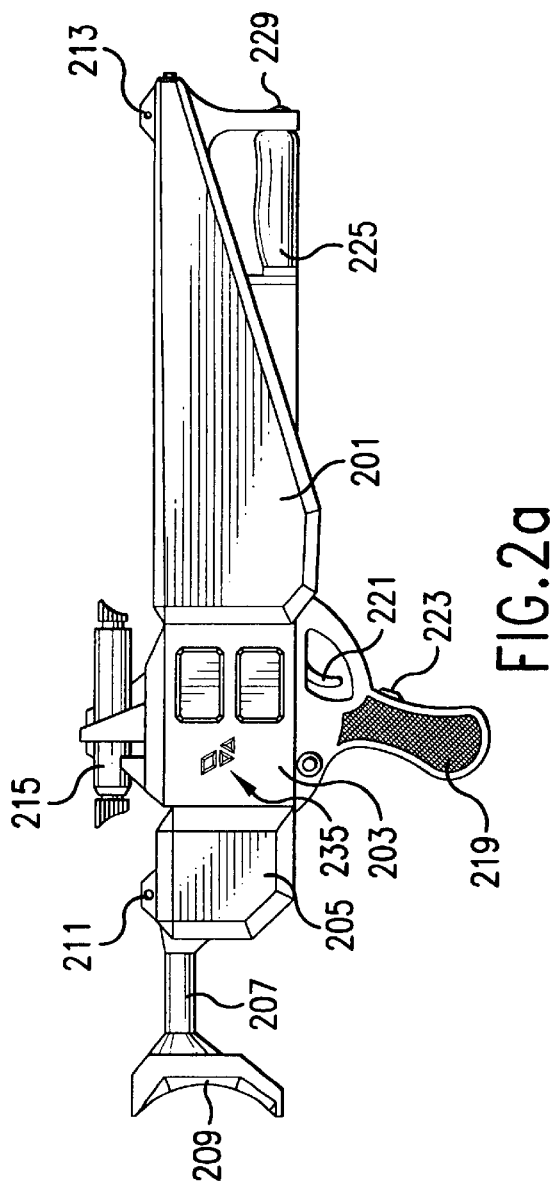
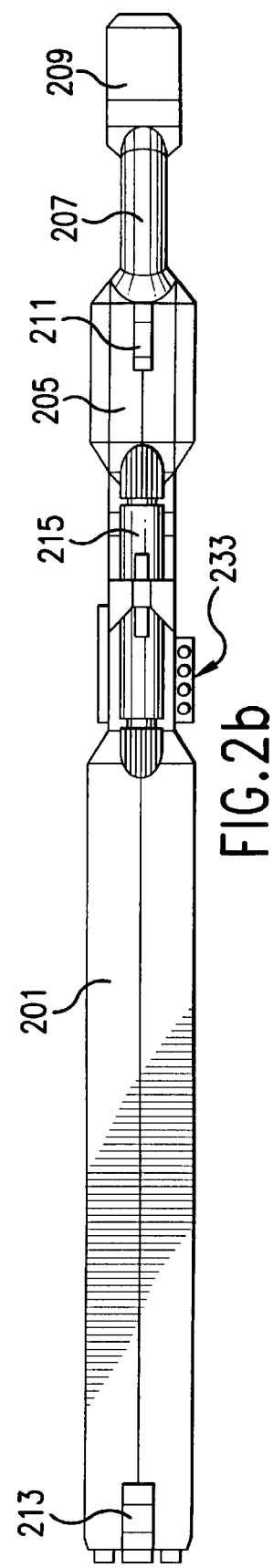
FIG. 2a
FIG. 2b

WEAPON SHAPED VIRTUAL REALITY CHARACTER CONTROLLER

FIELD OF THE INVENTION

The invention relates to an apparatus useful for controlling interactive computer games and more specifically to game controllers that are shaped like a weapon for control of a virtual reality character within a virtual reality game.

BACKGROUND OF THE PRIOR ART

Pressing keys on the keyboard of the computer controlled early computer games, such as 'pong'. This method of control was clumsy and slow, but more importantly it was not a realistic way to control movement of objects on a computer screen. To make such movement more intuitive and realistic, the Xerox corporation developed a two dimensional rolling controller known as the 'mouse', which is now widely used for graphic interface control in the Windows® and Apple® series of operating systems. These operating systems can be controlled by the computer's keyboard, but for all practical purposes the mouse or its analogs—the trackball, touchpad and the trackpoint® controller for laptop computers, have completely supplanted the keyboard for graphic interface control.

While the mouse was useful for general program control, it was completely inadequate for controlling complex computer games, many of which were aircraft flight simulators or required objects to be steered in two or three dimensions within the virtual reality environment (sometimes called "VR") of the computer game. In the late 1970s, Atari developed the 'joystick' controller for computer games. This device simulated the control stick in an aircraft. Switches mounted on the control arm of the joystick, or on its base, allowed gamers to control many aspects of their games, such as speed, weapons operations and other aircraft flight operations.

As computer games became more realistic and fast paced, game controllers became more complex and realistic. The simple sticks became yokes or wheels, and the controls became proportional and incorporated force feedback. When the screen object encounters something in the VR, the computer sends a signal to the joystick's base where tiny motors pull the joystick back precisely enough to trick the user into feeling a virtual texture. The sensations simulate textures, liquids and even centrifugal force. Many types of hand held controllers are now available, including VR gloves with three-dimensional motion sensors.

The prior art teaches simulated shooting where a rifle shaped controller is pointed at the screen and sensors detect the point of air to measure the player's skill at aiming. An example of such prior at is found in U.S Pat. No. 4,395,045 for a Television Precision Target Shooting Apparatus and Method, or in U.S. Pat. No. 5,641,288 for a Shooting Simulating Process and Training Device Using a VR Display Screen. This prior art uses the motion of the game player to control the aiming point of the controller on a remote screen. This general class of prior art is useful for developing shooting skills, but it is has only two controls: the trigger and the point of aim. Such a controller would not work at all in modern VR games because the essence of these VR games is that the player controls all the movements of an action character within the VR simulation. This action character in the VR simulation moves in many directions with the VR space of the game. The VR action character points and fires the weapon in the game, not the external player. The external game play controls the action of the VR action character. In all prior art of this known to the inventor, both the hands of the player must be used to point and fire the aimed controller. The controller has no control over the movements of the VR action character within the VR game space. These prior art controllers do not control action of a first person character within the VR game space, but, rather, allow the user to simulate use of an aimed weapon.

Many prior art controllers, such as U.S. Pat. No. 5,734,370 for a Computer Control Device, have multiple control buttons that allow the game player to control the movement of the VR action character within the VR game space. Game controllers of This type taught by the prior art are not intuitive. They are very awkward and slow when they are used to control computer games, such as Doom, Duke Nukem, and Quake, whose play demands that the player control many movements, attributes, weapons selection and point of aim of the action character within the VR game space. Despite the fact that these games are very popular, the prior art has not developed any controllers that make controlling the game characters within these games realistic.

SUMMARY OF THE INVENTION

One object of the present invention is to provide a VR weapon shaped game controller that provides intuitive control over multiple movements of a VR game character within a VR game space.

Another object of the present invention is to provide a rifle controller that incorporates one or more multiaxis controller into its forearm so as to allow control of the game character's motion within the VR game space by movement of the forearm controller.

Still a further object of the present invention is to provide a game controller for a first person aimed weapon computer game that allows all program functions to be preformed while the controller is used to move objects in the game's VR and to operate the weapon within the computer game. Examples of these game functions would include the game character's weapon selection, game level selection, invocation of special powers of the game character such as invisibility, invulnerability, etc.

Another object of the present invention is to provide a VR weapon shaped controller whose controls are programmable to allow it to be used with any computer game that requires gamers to move within a VR game space at the same time that the character must operate an aimed weapon within the game's VR.

A further object of the present invention is to provide a game controller for first person VR computer games that allows the player to control all movements and attributes of the game character within the VR while the controller has the look and feel of a real weapon, thereby enhancing the enjoyment of the VR game playing experience.

BRIEF DESCRIPTION OF THE DRAWINGS

FIG. 2a is a view of the right side of the present invention;

FIG. 2b is a view of the top of the present invention;

DESCRIPTION OF THE PREFERRED EMBODIMENT

All figures show the embodiment of the present invention that is adapted for use by a right-handed gamer. It should be understood that the present invention may be adapted for use by left handed players just by making a mirror image of the controller described in this embodiment.

Structurally, the preferred embodiment of the present invention is a VR rifle game controller ("VRR"). This is a multifunction game controller that has the appearance of a large caliber automatic weapon. It is also possible for it to be a pistol, a shotgun or any other weapon.

Figure 1:
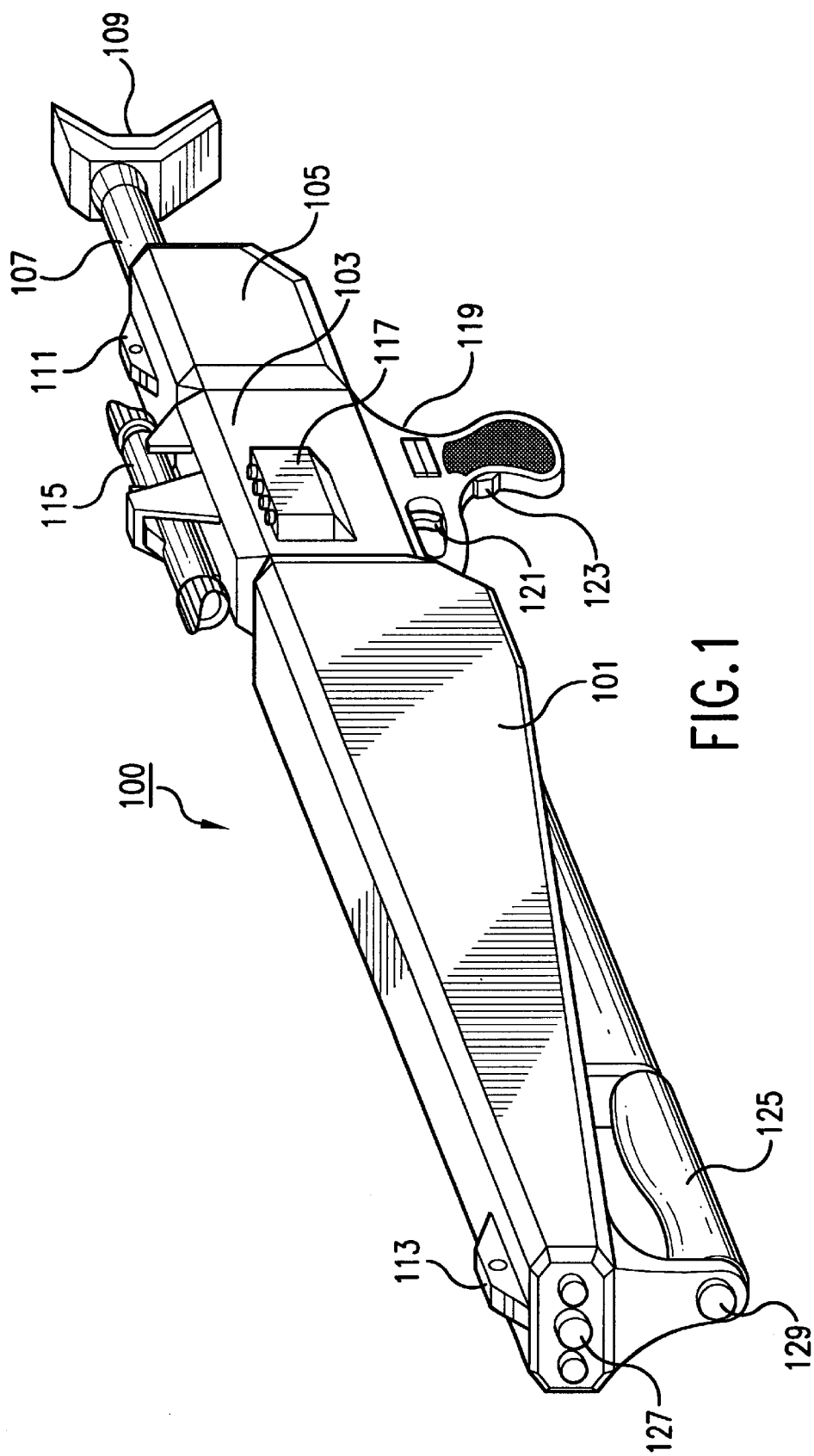
FIG. 1 is an isometric view of the VR rifle game controller taught by the present invention showing the disposition of its main parts.

As shown in its preferred embodiment in FIG. 1, VRR 100 has a barrel section 101 attached to breach unit 103, which is attached by recoil unit 105 to stock shaft 107 and shoulder plate 109. The top of VRR 100 has a fixed rear sight 111 and a fixed front sight 113. A riflescope or laser designator 115 is shown fixed on top of breach unit 103. Forearm controller 125 is mounted on the lower front of barrel 101. Selector switch unit 117 is mounted on breach unit 103 above pistol grip 119. Pistol grip 119 has a conventional trigger switch 121 and a secondary trigger switch 123. The front of forearm controller 125 has a run mode switch 129. The front of barrel 101 has a muzzle 127. VRR 100 may be made of any material, such as metal or plastic, that is sufficiently robust to survive ordinary use by gamers. Preferably it will be made of heavy metal to simulate the look and feel of a real weapon. In this case it may be desirable to equip the VRR with a shoulder strap, not shown.

A game player, not shown, would hold the present invention in his or her hands, controlling the parts of the present invention with his or her fingers and thumbs; like a real weapon. But unlike a real weapon, the present invention is not aimed directly by the game player at a target. Instead the game player uses the present invention to control the actions of the VR game character within the VR game space. This VR game character may aim its weapon, or it may move in many ways. Further it may invoke attributes or special powers within the program rules of the VR game space.

As will be described in detail below, the game player may use the present invention to move the VR game character within the VR game space. These movements may be left or right, forward or backwards, up or down, or they may be sliding or hopping or ducking—in general the present invention may control all of the movements of the VR character within the VR game space that the program allows (these motions can be very complex for modern VR first person games.) The prior art teaches using complex keystrokes on a keyboard or multiple button to push on a control pad to do many of the less common movements. By contrast, as will be detailed below, the present invention is intuitive, because it requires only the movement (sliding, twisting, pumping) of a part of the weapon, such as the forearm (the part of the rifle that is between the front of the action and the end of the barrel.)

VR characters in the VR game space must also select weapons and special attributes such as shields, invisibility, etc. that are uniquely defined by the program rules for each VR game. The present invention makes it possible for the game player to take all of these actions without taking his or her hands off the controller, thus allowing the VR character to move in the game space while changing weapons or attributes.

FIGS. 2a, 2b, 2c and 2d show the right, top, left and front views, respectively, of the VRR that was shown isometrically in FIG. 1. In these view figures corresponding numbers in the 200 series indicate corresponding structures to the structures named in FIG. 1; thus, they will not be repeated.

In FIG. 2a the right side of breach unit 203 is shown equipped with a control switch cluster 232. Cluster 232 comprises three switches that perform the 'start', 'pause' and 'map' commands of the computer game. They are on the right side of the VRR because they are not often used by the gamer during the course of the normal game. They only start and stop the action. Thus it is acceptable for the VRR to be rotated along its long axis whereby this switch would be operated by the gamer's left hand.

In FIG. 2b a group of four control switches 223 is shown on switch unit 217 on breach unit 203. These four switches control the selection of weapons other item inventory in the game. They are placed on the left side of the breach of the VRR so they may be operated quickly by the gamers left hand. These controls may be classed as controls that are used during the normal operation of the game. They are not, however, used to control the motion of the player within the game's VR. Thus it is acceptable to place these controls where they can be operated quickly, but not simultaneously with the movements of the gamer's character with the game's VR while the command is being entered.

Figure 2C:
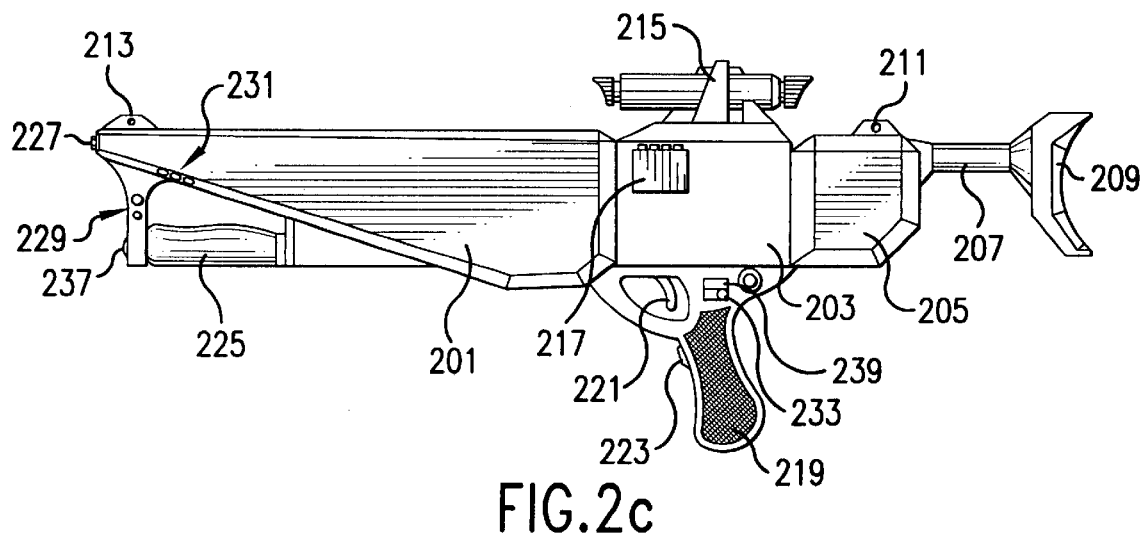
FIG. 2c is a view of the left side of the present invention.
Figure 2D:
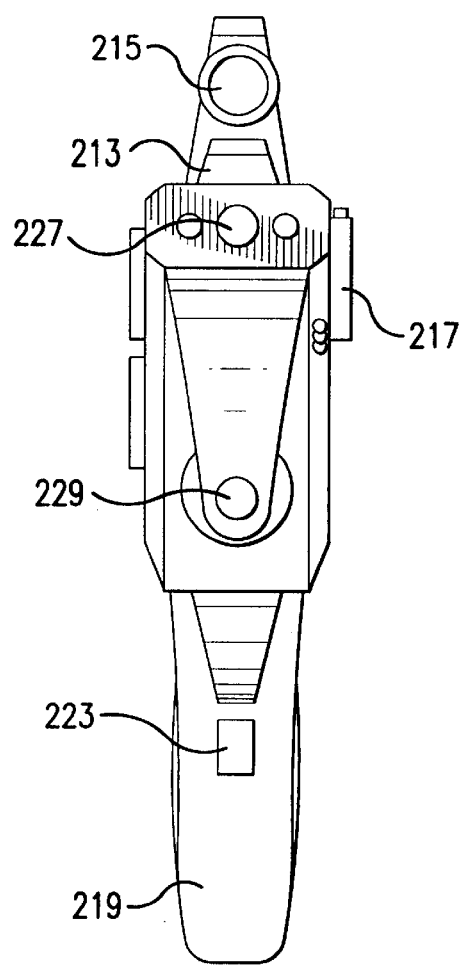
FIG. 2d is a view of the front of the present invention.

In FIG. 2c character action control for the VRR are shown. Primary trigger 221 is used as it would be with a real weapon, i.e. to activate the selected weapon tin the VR of the game. Secondary trigger 223 is used for alternate mode of weapon use or to control a second weapon. Near the triggers are the jump and crouch control buttons 239. The thumb of the gamer's right hand can activate these commands without requiring that the gamer take a trigger finger off of the trigger 221. This allows the character to jump and crouch within the game's VR while simultaneously using the weapon.

The operation of the multiaxis forearm controller 225 is the heart of the present invention. This controller is held by the gamers left hand, exactly like the forearm of a rifle in real combat. Movement of this forearm controller allows the gamer to cause the character in the VR to turn left or right and to move forward and move backwards. The gamer just moves his hand holding the multiaxis controller in the desired direction and character moves in that direction within the game's virtual environment.

A 'run' command button 229 on the front of the forearm controller 225 is operated by the right index finger of the gamer. Two clusters of control buttons 231 and 237 are located on the left side of the barrel 201 near the front of forearm controller 225 so they may be operated by the gamer's left thumb. These buttons control the commands 'look up', 'look down', 'strafe', 'strafe left' and 'strafe right'. All of these commands can be operated using the present invention while the gamer may simultaneously move the character within the VR environment of the computer game and fire the weapon. This allows the gaming experience to be more intuitive and realistic.

All of the VRR's control switches may be programmed, as is well known to those skilled in the are of computer game controllers, to work with any computer game. The VRR of the present invention may also incorporate sensory feedback, by causing, for example, the VRR to simulate the recoil of a rifle by moving a weight within the barrel unit under computer control when the VRR is fired.

The electronic details of the switches and multiaxis controller of the present invention, as well as their programming and connection to the computer, are well within the skill of the art of any competent electrical engineer who has experience in the design and manufacture of computer game controllers.

Although the present invention has been described by reference to its preferred embodiment as is disclosed in the specification and drawings above, many more embodiments of the present invention are possible without departing from the invention. Thus, the scope of the invention should be limited only by the appended claims.

What is claimed is:

1. A weapon shaped game controller to be held in the hands of a game player for use with a computer that is programmed create a virtual reality game space and a virtual reality game character that moves and uses a weapon within said virtual reality game space comprising:
   a weapon shaped body, said body having a stock, a barrel having a forearm and at least a first trigger switch and a second trigger switch, first said trigger switch being adapted to fire the weapon within the virtual reality of the computer game and the second trigger switch located in front of and in tandem to said first trigger switch and adapted to change an aspect of the virtual reality game space;
   a first multiaxis controller and a second multiaxis controller, both said first and second contollers being attached to the weapon shaped body near the position of the users thumbs when the weapon shaped body is held by the user, and including means for sending commands from said first multiaxis controllers to the computer to move the position of the character within the virtual reality of the computer game and including means for sending commands from said second multi-axis controllers to the computer to move the point of view of the character within the virtual reality of the computer game; and
   a plurality of control switch means for controlling aspects of the virtual character or virtual reality within a computer game, said switch means being mounted proximate to and behind the game controller's multi-axis controllers within the distance that may be reached by the game player's thumbs without repositioning the player's hands on the controller's weapon shaped body.

2. A controller as in claim 1 including a second plurality of switches located near the trigger switch so as to be actuated by the user's thumb while the user's trigger finger is on said trigger switch, said switches being adapted to control the actions and movements of the character within the virtual reality game space.

3. A controller as in claim 2 including at least one group of control switches not located proximate the trigger switch.

4. A controller as in claim 2 including means for force feedback to the user when the trigger switch is actuated, whereby the controller simulates the recoil of firing a rifle.

* * * * *